May 14, 1963  A. VAN GIJZEN  3,089,803
METHOD FOR ADHESIVE BONDING OF SYNTHETIC MATERIAL TO RUBBER
Filed Feb. 12, 1959

INVENTOR
Andries Van Gijzen

BY
Stevens, Davis, Miller & Mosher
ATTORNEYS 3,089,803
Patented May 14, 1963

3,089,803
METHOD FOR ADHESIVE BONDING OF SYNTHETIC MATERIAL TO RUBBER
Andries van Gijzen, Velp, Netherlands, assignor to N.V. Onderzoekingsinstituut Research, Arnhem, Netherlands, a corporation of the Netherlands
Filed Feb. 12, 1959, Ser. No. 792,722
Claims priority, application Netherlands Feb. 20, 1958
1 Claim. (Cl. 156—153)

This invention relates to rubber articles provided with reinforcement layers consisting of films or foils of artificial polymerization or polycondensation products, and to a process of preparing the same.

In the production of these reinforced rubber articles the films or foils, which products for convenience will hereinafter be referred to as films, are provided with a thin coating of liquid adhesives, especially latices of natural or synthetic rubber, and then connected to the rubber by means of vulcanizing.

In practice it has heretofore been found that the adhesion of the film of artificial polymerization or polycondensation products is unsatisfactory, and it sometimes even happens that practically no adhesion is obtained.

It has already been proposed to try to improve the adhesion of films of artificial polymerization or polycondensation products with respect to rubber by roughening (for example by means of grinding discs) the surface of the film before the application of the liquid adhesive thereto. While in some cases a somewhat improved degree of adhesion was obtained, nevertheless in the application of films of polyamides or polyesters, such as polyethylene terephthalate, the adhesion is not substantially improved for practical purposes. Furthermore, the uniform or substantially uniform roughening of films by means of grinding discs is difficult to carry out in actual practice in view of the fact that these films are very thin. Often thin places are thereby produced in the films which adversely affect their strength and usefulness for this purpose.

It is therefore an object of the present invention to effect an improved adhesion between films of high molecular weight synthetic polymerization or polycondensation products and rubber. It is a further object to provide improved composite bonded rubber articles of this nature. Other objects will become apparent as the description proceeds.

According to the present invention it has now been found that a satisfactory adhesion may be obtained between films of polymerization or polycondensation products and rubber when using films provided with recesses homogeneously distributed over the surface thereof at a mutual distance of a maximum of about 0.5 mm., and preferably about 0.05 to 0.2 mm., and applied to the films by embossing.

The embossing of films of artificial substances of this general character is in and of itself known for embellishing the appearance thereof, such as when making films resemble fabrics.

The provision, according to the present invention, of recesses in the surface of the films by means of embossing may be done at room temperature. Preferably, however, the embossing is done at elevated temperatures. When using films of polyaminocaproic acid the embossing preferably takes place, for example, at a temperature of about 180° C.

It is preferred to heat the embossing rollers during the embossing step; however, it is also possible to heat the films to the desired temperature.

Furthermore, it has been found according to the present invention that when the embossing of the films is carried out with the aid of a so-called Schreiner calender the adhesion of the resulting embossed films is very satisfactory after they have been treated with a liquid adhesive. A Schreiner calender is a well-known type of calender which has steel rollers which rollers have been engraved with grooves having a mutual distance of 0.05 to 0.1 mm. Among other uses, calenders of this kind are employed in the textile industry to give a silky gloss to cotton fabrics.

The improvement of the degree of adhesion of the films to the rubber is noticeable with all films of polymerization or polycondensation products, such as polyalkenes, especially polyethenes and polypropenes, polystyrenes, polyvinyl chlorides, polyamides and polyesters, of which last high polymeric polymethylene terephthalates, especially polyethylene terephthalate, as well as polycarbonates are useful representatives.

The best effect, however, is obtained with films of polyamides and polyethylene terephthalates. By "polyamides" are meant long-chain synthetic polymeric carbonamides which have recurring carbonamide groups as an integral part of the main polymer chain and which are capable of being formed into a filament or film—see e.g. the definition in Wakeman, "The Chemistry of Synthetic Plastics," Reinhold, 1947, page 257. Not only polyamides produced from caprolactam but also those which are prepared by polycondensation from various dicarboxylic acids and diamines may be advantageously employed in accordance with the present invention. Since the polyamides are well known and per se form no part of the present invention it is deemed unnecessary in the interests of brevity to do more than supplement the present disclosure by referring to typical prior art disclosures illustrative thereof merely by way of example, such as Du Pont's U.S. patents to Carothers including Nos. 2,071,250–3 and 2,130,948 and the "Collected Papers of Wallace Hume Carothers on High Polymeric Substances," Interscience Publishers, Inc., New York, 1940.

In the selection of the films to be employed, the softening point of the artificial substance of which the films consist is of great importance. This softening point must in fact be at least somewhat higher than the temperatures which may occur during the production or during use of the final composite reinforced rubber articles.

In case the films show a tendency to shrink at the temperatures employed during vulcanizing or the temperatures which may occur during use of the final rubber article, it may be of advantage to so stabilize the films (either before or after embossing) in a per se known manner, such as by heating in tension-free condition, that at said temperatures there is no, or practically no, tendency to shrink on the part of the films.

As a result of the embossing operation contemplated by the present invention, the films not only adhere better to natural rubber but also to artificial rubber.

The embossed films are employed in the production of such reinforced or bonded rubber articles in which a very satisfactory adhesion between the films and the rubber is a prime consideration, as is the case with automobile tires and driving belts.

In order to further illustrate the present invention attention is directed to the accompanying drawing showing the step-wise production of a bonded rubber article wherein—

Figure 1:
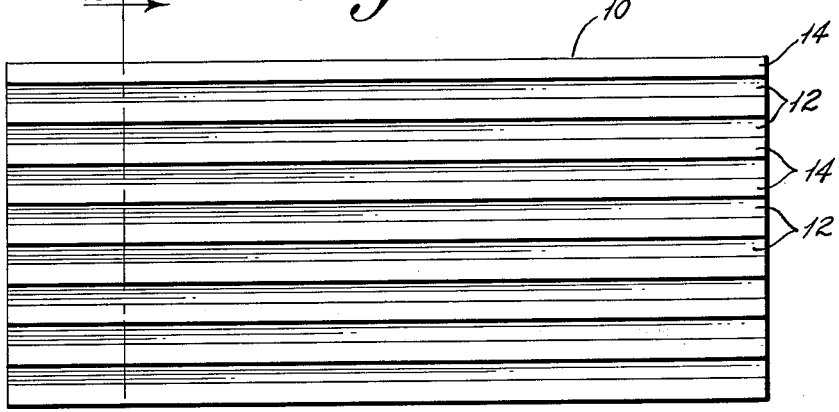
FIG. 1 is a top plan view of a normally smooth-surfaced reinforcing film having recesses homogeneously distributed thereover.
Figure 2:
FIG. 2 is a sectional view taken along line 2—2' of FIGURE 1 in the direction of the arrows.
Figure 3:
FIG. 3 is a similar sectional view having a liquid adhesive placed on said surface.
Figure 4:
FIG. 4 is a similar sectional view showing the completed bonded rubber article.

In the drawings reference numeral 10 indicates the synthetic film having homogeneous recesses 12 in the surface 14. In FIGURE 3 reference numeral 16 indicates the liquid adhesive which is distributed across the surface of the film and is seen to be particularly collected in the recesses 12. After the liquid adhesive is dried, an unvulcanized rubber strip 18 is placed against surface 14 and thereon vulcanized to produce the completed bonded rubber article 20 shown in FIGURE 4.

In order still better to describe the present invention, the following example of a typical procedure and a typical product is given:

Example

A thin strip of polyaminocaproic acid having a length of 20 cm., a width of 2.5 cm., and a thickness of 50 microns was embossed on one side with the aid of a Schreiner calender. The temperature of the rollers of the calender was 180° C.

The embossed strip having about 5000 recesses per $cm.^2$ was covered on one side with a rubber latex containing the condensation product of resorcinol and formaldehyde, after which the rubber latex was dried at 120° C. The strip was then placed with its embossed side on a strip of unvulcanized rubber having a length of 20 cm., a width of 2.5 cm., and a thickness of 3 mm., and thereafter vulcanized on the rubber strip for 30 min. at 143° C.

The adhesion of the film to the strip of rubber was so satisfactory that the film as such could not be torn from the rubber strip. The adhesion between the film and rubber strip in fact appeared to be higher than the shearing strength of the rubber, so that the film after removal from the rubber was covered with a layer of rubber.

A strip of polyaminocaproic acid of the same dimensions, but not embossed, was also vulcanized to a rubber strip in the same manner as described hereabove. On thereafter removing the strip of polyaminocaproic acid from the strip of rubber it appeared that no rubber was present on the strip of polyaminocaproic acid.

While a specific example of a preferred method of operation and a preferred product embodying the present invention has been set forth above, it will be understood that many changes and modifications may be made therein without departing from the spirit of the invention. It will therefore be understood that the example cited above is intended to be illustrative only, and is not intended to limit the scope of the invention.

What is claimed is:

A process of bonding normally smooth-surfaced films of synthetic material to rubber, said synthetic material being selected from the class consisting of polyamides and polyesters, comprising forming recesses homogeneously over one surface of said film at a mutual distance of about 0.05–0.2 mm., covering said one surface with a liquid adhesive, drying said adhesive on said surface, placing said one surface against an unvulcanized rubber article and vulcanizing said rubber article on said film.

References Cited in the file of this patent
UNITED STATES PATENTS

| | | |
|---|---|---|
| 1,737,033 | Talbot | Nov. 26, 1929 |
| 1,751,546 | Glidden et al. | Mar. 25, 1930 |
| 2,361,082 | Brown | Oct. 24, 1944 |
| 2,425,349 | Schroeder | Aug. 12, 1947 |
| 2,667,436 | Goepfert et al. | Jan. 26, 1954 |
| 2,768,923 | Kepple et al. | Oct. 30, 1956 |
| 2,888,058 | Manis et al. | May 26, 1959 |
| 2,993,309 | Barnes et al. | July 25, 1961 |